(12) United States Patent
Nakagawa et al.

(10) Patent No.: US 11,384,838 B2
(45) Date of Patent: Jul. 12, 2022

(54) SEAL MEMBER

(71) Applicant: Applied Materials, Inc., Santa Clara, CA (US)

(72) Inventors: Ippei Nakagawa, Gojo (JP); Nobuhiro Yoshida, Gojo (JP); Hamid Noorbakhsh, Oakland, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/327,573

(22) PCT Filed: Sep. 5, 2017

(86) PCT No.: PCT/JP2017/031907
§ 371 (c)(1),
(2) Date: Feb. 22, 2019

(87) PCT Pub. No.: WO2018/047808
PCT Pub. Date: Mar. 15, 2018

(65) Prior Publication Data
US 2019/0242480 A1  Aug. 8, 2019

(30) Foreign Application Priority Data

Sep. 9, 2016  (JP) .............................. JP2016-176628

(51) Int. Cl.
*F16J 15/02* (2006.01)
*F16J 15/06* (2006.01)
*F16J 15/3232* (2016.01)

(52) U.S. Cl.
CPC ........... *F16J 15/025* (2013.01); *F16J 15/024* (2013.01); *F16J 15/061* (2013.01); *F16J 15/3232* (2013.01)

(58) Field of Classification Search
CPC ........ F16J 15/024; F16J 15/025; F16J 15/061; F16J 15/3232; F16J 15/3236; F16J 15/3268
(Continued)

(56) References Cited

U.S. PATENT DOCUMENTS

| 2,547,185 A | * | 4/1951 | Von Bolhar | ......... | F16J 15/3456 |
| | | | | | 277/380 |
| 3,228,705 A | * | 1/1966 | Underwood | ......... | F16J 15/3204 |
| | | | | | 277/558 |

(Continued)

FOREIGN PATENT DOCUMENTS

| CN | 204114112 U | | 1/2015 | | |
| GB | 1519302 A | * | 7/1978 | ........... | F16J 15/3224 |

(Continued)

OTHER PUBLICATIONS

JP2016151282 Machine Translation, retrieved espace.net Dec. 31, 2020 (Year: 2016).*

(Continued)

*Primary Examiner* — Nicholas L Foster
(74) *Attorney, Agent, or Firm* — Patterson + Sheridan LLP

(57) ABSTRACT

A seal member includes a bottom portion, a first side wall portion, a second side wall portion, and an outer wall portion. At least one of the first side wall portion and the second side wall portion is provided to be outwardly widened from the bottom portion toward the outer wall portion with respect to a virtual plane perpendicular to an axis. The outer wall portion has a recessed portion recessed toward a bottom portion side, between the first side wall portion and the second side wall portion, and the outer wall portion forms a first lip region in a region including the first side wall portion, and forms a second lip region in a region including (Continued)

the second side wall portion, with the recessed portion being sandwiched therebetween.

19 Claims, 9 Drawing Sheets

(58) Field of Classification Search
USPC .......................................................... 277/567
See application file for complete search history.

(56) References Cited

U.S. PATENT DOCUMENTS

| | | | | |
|---|---|---|---|---|
| 3,584,889 | A * | 6/1971 | Sheets | F16L 21/022 |
| | | | | 277/626 |
| 3,592,491 | A * | 7/1971 | Glover | F16L 47/08 |
| | | | | 285/230 |
| 3,825,272 | A | 7/1974 | Townsend | |
| 4,438,936 | A * | 3/1984 | Schlegel | F16J 15/38 |
| | | | | 277/567 |
| 5,429,374 | A * | 7/1995 | Eichenberger | F16J 15/46 |
| | | | | 277/552 |
| 6,328,316 | B1 * | 12/2001 | Fukuhara | F16J 15/024 |
| | | | | 277/626 |
| 6,523,833 | B1 * | 2/2003 | Ishigaki | F16J 15/025 |
| | | | | 277/549 |
| 7,314,590 | B2 * | 1/2008 | Yeager | B29C 45/2608 |
| | | | | 264/255 |
| 8,079,600 | B2 * | 12/2011 | Shojima | F16J 15/062 |
| | | | | 277/644 |
| 8,181,972 | B2 * | 5/2012 | Tsuji | F16K 51/02 |
| | | | | 277/644 |
| 9,892,945 | B2 * | 2/2018 | Nakagawa | H01L 21/67126 |
| 2007/0063451 | A1 * | 3/2007 | Yeager | B29C 45/2608 |
| | | | | 277/566 |
| 2008/0193068 | A1 | 8/2008 | Petri | |
| 2009/0014323 | A1 | 1/2009 | Yendler et al. | |
| 2009/0014962 | A1 * | 1/2009 | Ducworth | F16J 15/3236 |
| | | | | 277/309 |
| 2009/0261534 | A1 * | 10/2009 | Pradelle | F16J 15/3236 |
| | | | | 277/648 |
| 2009/0315277 | A1 * | 12/2009 | Iwamoto | F16J 15/061 |
| | | | | 277/641 |
| 2010/0027188 | A1 | 2/2010 | Liu et al. | |
| 2010/0084827 | A1 * | 4/2010 | Peddle | F16J 15/061 |
| | | | | 277/644 |
| 2011/0253667 | A1 | 10/2011 | Hiss | |
| 2013/0097840 | A1 | 4/2013 | Schaefer et al. | |
| 2013/0286530 | A1 | 10/2013 | Lin et al. | |
| 2014/0065835 | A1 | 3/2014 | Kadkhodayan et al. | |
| 2015/0170942 | A1 | 6/2015 | Chhatre et al. | |
| 2015/0183187 | A1 | 7/2015 | Lin et al. | |
| 2015/0279706 | A1 * | 10/2015 | Nakagawa | H01L 21/67126 |
| | | | | 277/641 |
| 2019/0242480 | A1 | 8/2019 | Nakagawa et al. | |

FOREIGN PATENT DOCUMENTS

| | | |
|---|---|---|
| JP | S53-149218 U | 11/1978 |
| JP | S61-009644 U | 1/1986 |
| JP | SHO61-009644 | 7/1987 |
| JP | 2005-083414 A | 3/2005 |
| JP | 2015-515760 A | 5/2015 |
| JP | 2016151282 A * | 8/2016 |
| TW | 200730750 A | 8/2007 |
| WO | 2008048518 A1 | 4/2008 |
| WO | WO 2013/162641 A1 | 10/2013 |

OTHER PUBLICATIONS

International Search Report dated Nov. 28, 2017, which issued in corresponding PCT Patent Application No. PCT/JP2017/031907, including Eng. Translation.
Taiwanese Office Action dated Apr. 28, 20202, which issued in the corresponding Taiwanese Patent Application No. 10920393780, including English translation.
Taiwanese Office Action dated Apr. 28, 20202, which issued in the corresponding Taiwanese Patent Application No. 106130751, including English translation.
Korean Patent Application No. 10-2019-7009771, Office Action dated Jul. 22, 2021, 16 pages.
Taiwan Patent Application No. 106130751 Office Action and Search Report dated Aug. 31, 2020, 8 pages.
Korean Patent Application No. 10-2021-7029314, Office Action dated Jan. 21, 2022, 8 pages.
Korean Patent Application No. 10-2019-7009771, Office Action dated Jan. 20, 2022, 9 pages.
International Search Report and Written Opinion for PCT/US2017/053470 dated Jan. 5, 2018.
Taiwan Patent Application No. 106130751, Office Action dated Mar. 23, 2021, 8 pages.
Taiwan Office Action for Taiwan Patent Application No. 110121345 dated Apr. 26, 2022.

* cited by examiner

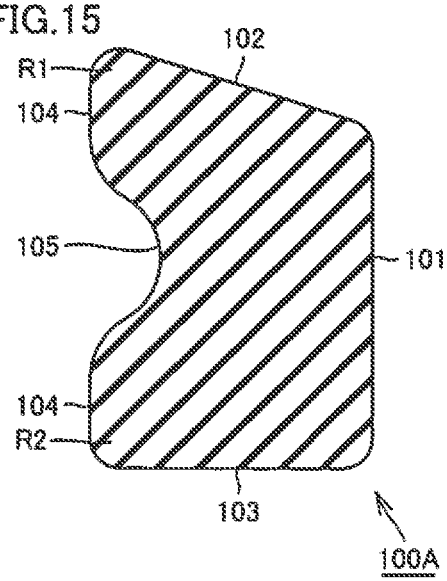
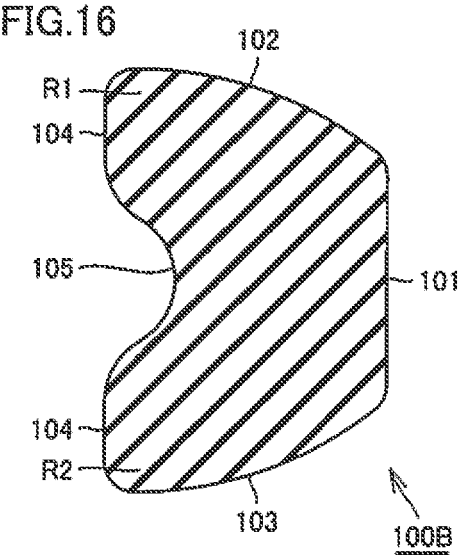

SEAL MEMBER

TECHNICAL FIELD

The present invention relates to a seal member, and more particularly to a seal member to be fitted into an annular groove provided in an outer circumferential surface of a cylindrical member.

BACKGROUND ART

Regarding a conventional seal member, for example, in Japanese National Patent Publication No. 2015-515760 (PTL 1), an annular groove is provided in an outer circumferential surface of a cylindrical member provided to a device, and a seal member having a circular cross sectional shape is fitted into the groove.

Inside the groove, by press-fitting the seal member into the groove, airtight separation between the outside and the inside can be established based on a restoring force of the seal member. This prevents an environment having an adverse effect on the outside from entering the inside.

CITATION LIST

Patent Literature

PTL 1: Japanese National Patent Publication No. 2015-515760

SUMMARY OF INVENTION

Technical Problem

A seal member made of an elastic member is fitted inside a groove in a radially compressed and deformed state, and adhesiveness between the seal member and wall surfaces of the groove is enhanced by a restoring force (elastic force) by which the seal member itself attempts to return to its original shape. However, in the case of a seal member having a circular cross sectional shape, it is necessary to considerably deform the seal member radially when it is desired to increase a contact area with the wall surfaces of the groove to improve sealing performance. However, if the seal member is considerably deformed radially, a compression force is increased, making workability at the time of fitting the seal member inside the groove difficult.

On the other hand, if the seal member is fitted inside the groove in a less deformed state, the contact area between the seal member and the wall surfaces of the groove is decreased. Thus, when the contact area is gradually decreased due to degradation of the seal member from the outside, the life as a seal member is shortened.

An object of the present invention is to solve the aforementioned problem, and to provide a seal member to be fitted into an annular groove provided in an outer circumferential surface of a cylindrical member, having a configuration capable of being easily fitted into the groove, and capable of increasing the life as a seal member.

Solution to Problem

This seal member is a closed annular seal member to be fitted into a radially recessed annular groove provided in an outer surface of a cylindrical member extending along a direction of an axis. The seal member is made of an elastic member. The groove includes a bottom wall, a first side wall located on one side in the direction of the axis, and a second side wall located on the other side in the direction of the axis and facing the first side wall. When the seal member is viewed in a sectional shape along a virtual plane including the axis, the seal member includes a bottom portion located on a side close to the bottom wall, a first side wall portion located on a side close to the first side wall, a second side wall portion located on a side close to the second side wall, and an outer wall portion opposite to the bottom portion. At least one of the first side wall portion and the second side wall portion is provided to be outwardly widened from the bottom portion toward the outer wall portion with respect to a virtual plane perpendicular to the axis. The outer wall portion has a recessed portion recessed toward a bottom portion side, between the first side wall portion and the second side wall portion. The outer wall portion forms a first lip region in a region including the first side wall portion, and forms a second lip region in a region including the second side wall portion, with the recessed portion being sandwiched therebetween.

In another aspect, both the first side wall portion and the second side wall portion are provided to be outwardly widened from the bottom portion toward the outer wall portion with respect to the virtual plane perpendicular to the axis.

In another aspect, both the first side wall portion and the second side wall portion have an arc-shaped form swelling outward.

Advantageous Effects of Invention

According to the seal member, a seal member to be fitted into an annular groove provided in an outer circumferential surface of a cylindrical member has a configuration capable of being easily fitted into the groove, and capable of increasing the life as a seal member.

BRIEF DESCRIPTION OF DRAWINGS

FIG. 15 is a cross sectional view of a seal member in a second embodiment.

FIG. 16 is a cross sectional view of a seal member in a third embodiment.

DESCRIPTION OF EMBODIMENTS

Figure 1:
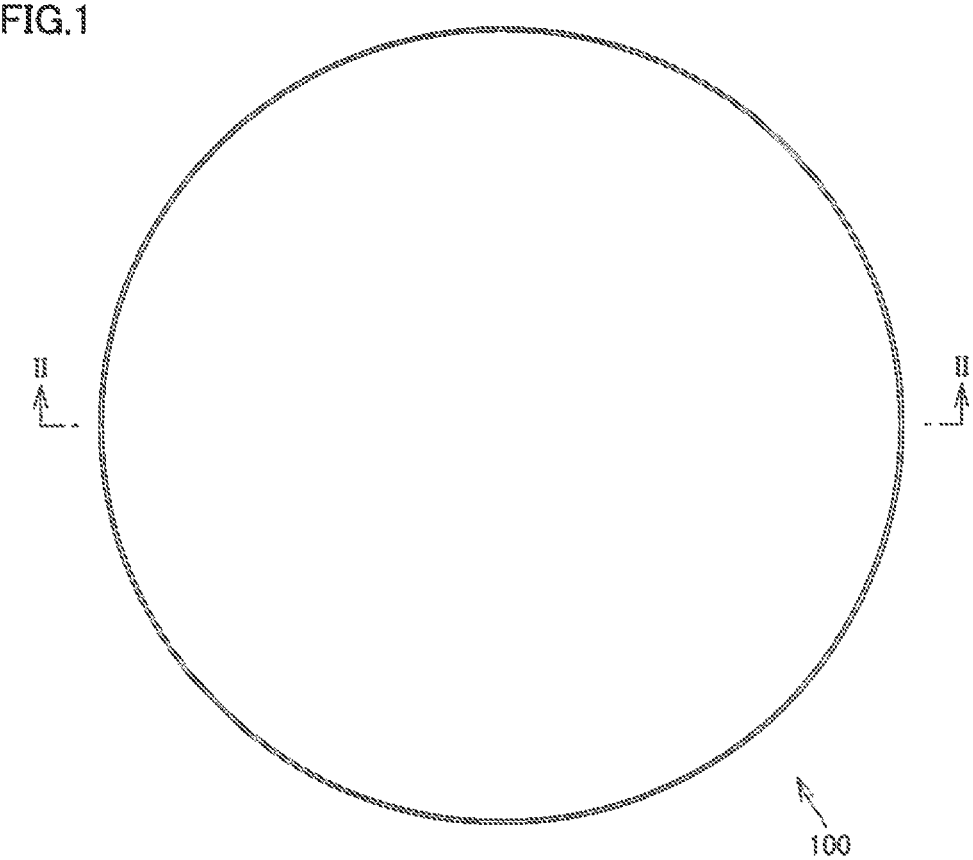
FIG. 1 is a plan view of a seal member in a first embodiment.

A seal member in each embodiment based on the present invention will now be described with reference to the drawings. It should be noted that, when the number, amount, or the like is referred to in each embodiment described below, the scope of the present invention is not necessarily limited to such a number, amount, or the like, unless otherwise specified. In addition, identical or corresponding parts will be designated by the same reference numerals, and an overlapping description may not be repeated.

First Embodiment: Seal Member 100

Figure 2:
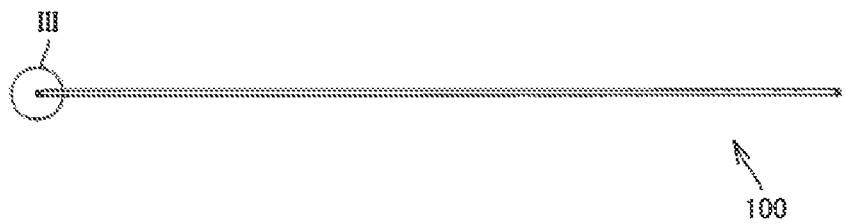
FIG. 2 is a cross sectional view taken along a line II-II in FIG. 1 and viewed in the direction of arrows.
Figure 3:
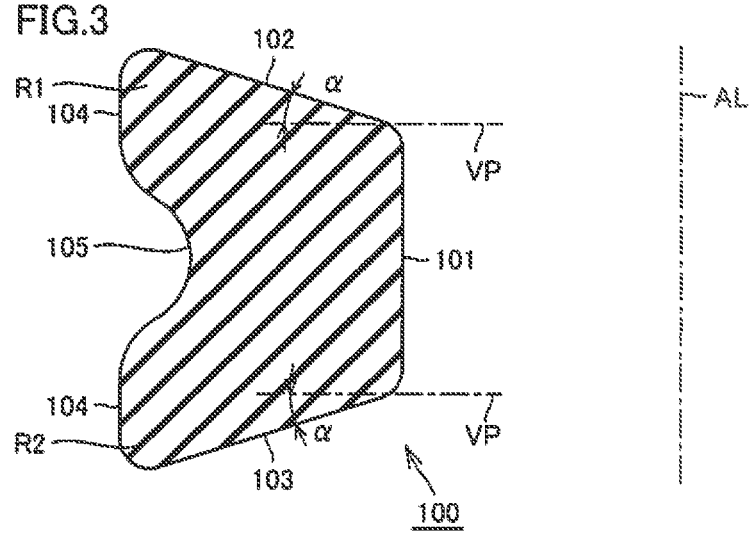
FIG. 3 is an enlarged cross sectional view of a region surrounded by III in FIG. 2.

A structure of a seal member 100 in the present embodiment will be described with reference to FIGS. 1 to 4. FIG. 1 is a plan view of seal member 100, FIG. 2 is a cross sectional view taken along a line II-II in FIG. 1 and viewed in the direction of arrows, FIG. 3 is an enlarged cross sectional view of a region surrounded by II in FIG. 2, and FIG. 4 is a schematic view showing a state of fitting seal member 100 into a groove.

Figure 4:
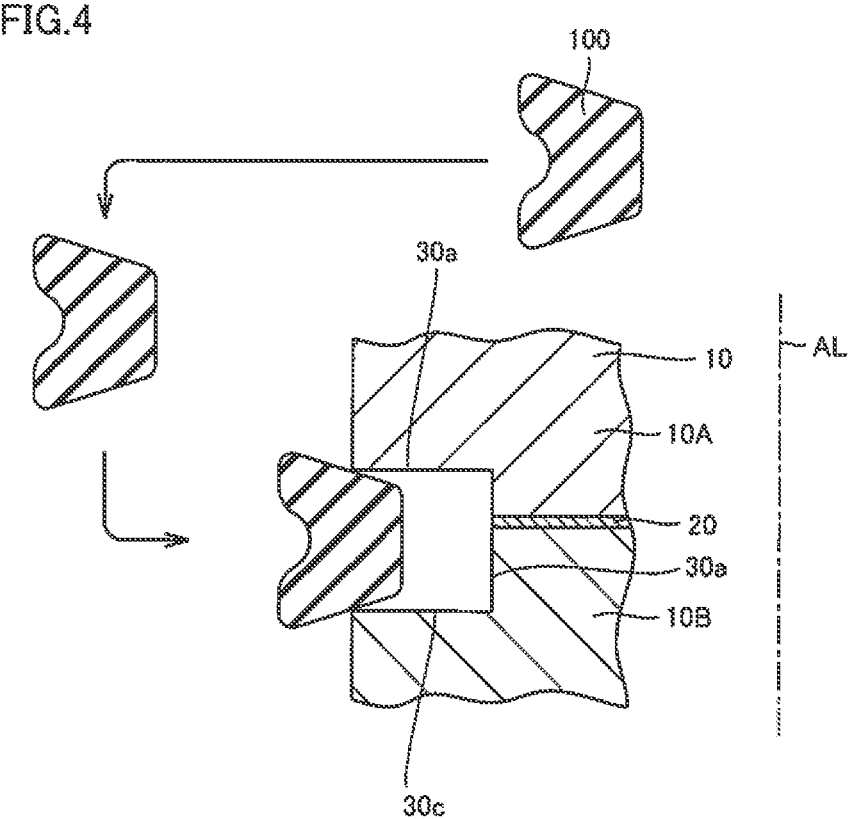
FIG. 4 is a schematic view showing a state of fitting the seal member in the first embodiment into a groove.

Seal member 100 in the present embodiment has a closed annular form to be fitted into a radially recessed annular groove 30 provided in an outer surface of a cylindrical member 10 extending along a direction of an axis AL as shown in FIG. 4.

Groove 30 includes a bottom wall 30a, a first side wall 30b located on one side in the direction of axis AL, and a second side wall 30c located on the other side in the direction of axis AL and facing first side wall 30b. Cylindrical member 10 is composed of a first member 10A and a second member 10B, and first member 10A and second member 10B are joined by an adhesive 20. Adhesive 20 is exposed at bottom wall 30a of groove 30. Groove 30 has dimensions of about 355 mm in inner diameter, about 1.85 mm in height (up/down direction in FIG. 4), and about 1.85 mm in width (right/left direction in FIG. 4), for example.

Examples of cylindrical member 10 having such a structure include a post of a semiconductor substrate mounting table in a plasma etching device used for a semiconductor manufacturing device.

Referring to FIGS. 1 to 3, seal member 100 has a closed annular form as a whole. Seal member 100 has an inner diameter of about 351 mm, a height of about 2.4 mm (up/down direction in FIG. 3), and a width of about 1.6 mm (right/left direction in FIG. 3), for example.

When seal member 100 is viewed in a sectional shape along a virtual plane including axis AL, seal member 100 has an external form including a bottom portion 101 located on a side close to bottom wall 30a of groove 30, a first side wall portion 102 located on a side close to first side wall 30b of groove 30, a second side wall portion 103 located on a side close to second side wall 30c of groove 30, and an outer wall portion 104 opposite to bottom portion 101.

First side wall portion 102 and second side wall portion 103 are provided to be outwardly widened from bottom portion 101 toward outer wall portion 104 with respect to a virtual plane VP perpendicular to axis AL. An intersection angle ($\alpha°$) between first side wall portion 102 and virtual plane VP is set as appropriate in the range of about 5° to 45°. An intersection angle ($\alpha°$) between second side wall portion 103 and virtual plane VP is similarly set as appropriate in the range of about 5° to 45°.

Outer wall portion 104 has a recessed portion 105 recessed toward a bottom portion 101 side, between first side wall portion 102 and second side wall portion 103. Thereby, a first lip region R1 is formed in a region including first side wall portion 102, and a second lip region R2 is formed in a region including second side wall portion 103, with recessed portion 105 being sandwiched therebetween.

As a material used for seal member 100, an elastic member such as rubber is used, because seal member 100 is used with first lip region R1 and second lip region R2 being elastically deformed as described later. As the elastic member used for seal member 100, for example, a fluorine rubber (FKM) or a perfluoroelastomer (FFKM) is mainly used.

Seal member 100 is required to have plasma-resistant properties, purity, vacuum sealing properties, heat resistance, maintainability, operation stability for dynamic applications, cost performance, and the like. In particular, at a portion which requires plasma-resistant properties, a perfluoroelastomer is mainly used.

Examples of a suitable material for the seal member adaptable to novel semiconductor manufacturing devices for which technological innovation has been promoted include FLUORITZ (registered trademark) series manufactured by NIPPON VALQUA, LTD., which is an unfilled perfluoroelastomer excellent in plasma-resistant properties, non-adhesiveness, purity, and heat resistance. FLUORITZ (registered trademark) series is a material having significantly improved plasma-resistant properties (radical-resistant properties, crack-resistant properties) and non-adhesiveness, when compared with conventional perfluomelastomers.

(Fitting Properties)

Figure 5:
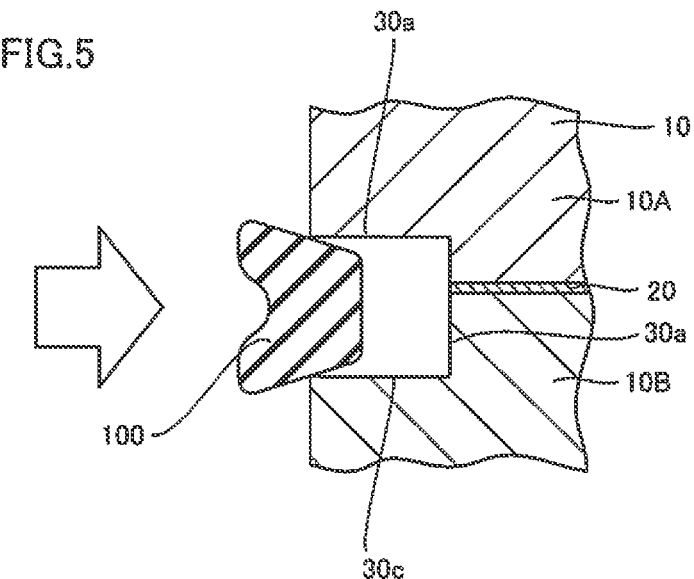
FIG. 5 is a schematic cross sectional view showing a state immediately before fitting the seal member in the first embodiment into the groove.

Next, fitting properties of seal member 100 in the present embodiment into groove 30 will be described with reference to FIGS. 4 to 7C. FIG. 5 is a schematic cross sectional view showing a state immediately before fitting seal member 100 into groove 30, FIG. 6 is a schematic cross sectional view showing a state after fitting seal member 100 inside groove 30, and FIGS. 7A, 7B, and 7C are each a schematic cross sectional view showing an incorrect state of fitting seal member 100 into groove 30.

In seal member 100 in the present embodiment, first side wall portion 102 and second side wall portion 103 are provided to be outwardly widened from bottom portion 101 toward outer wall portion 104 with respect to virtual plane VP perpendicular to axis AL. Thereby, as shown in FIG. 4, the inner diameter of seal member 100 is expanded to be larger than an outer shape of cylindrical member 10, and the bottom portion 101 side is positioned on a groove 30 side.

Figure 6:
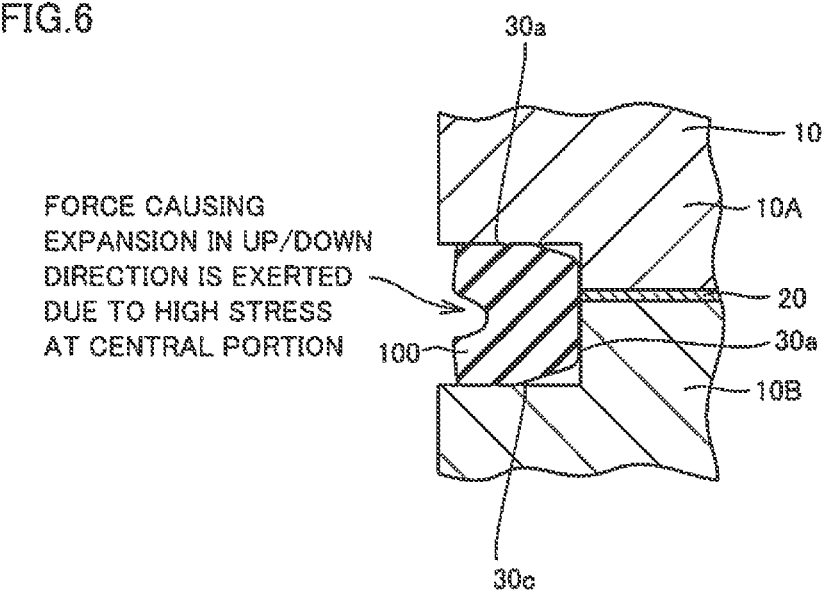
FIG. 6 is a schematic cross sectional view showing a state after fitting the seal member in the first embodiment inside the groove.

Thereby, as shown in FIGS. 5 and 6, seal member 100 can be fitted into groove 30 with a correct attitude, based on a restoring force of seal member 100 by which seal member 100 having the expanded diameter attempts to contract its diameter. By gradually pushing and inserting seal member 100 into groove 30, both first lip region R1 and second lip region R2 are inclined toward a recessed portion 105 side. In addition, first side wall portion 102 is in pressure contact with first side wall 306 of groove 30, and second side wall portion 103 is in pressure contact with second side wall 30c of groove 30. This can enhance adhesiveness between seal member 100 and wall surfaces of groove 30. The crushing ratio of seal member 100 is set in the range of about 7% to 35%. The crushing ratio is defined by "((natural height of seal member 100−height of groove 30)/natural height of seal member 100)×100%".

Figure 7A:
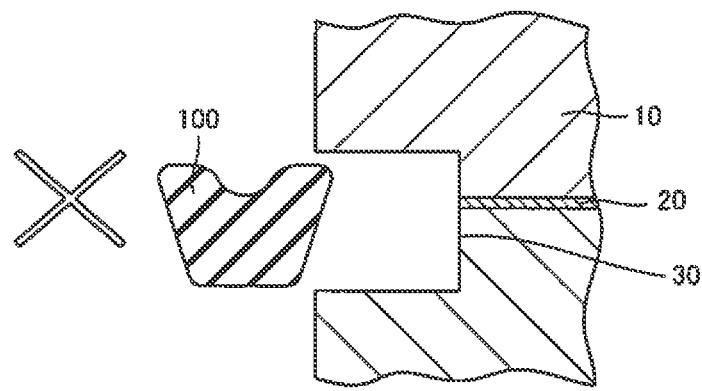
FIG. 7A is a schematic cross sectional view showing an incorrect state of fitting the seal member into the groove.
Figure 7B:
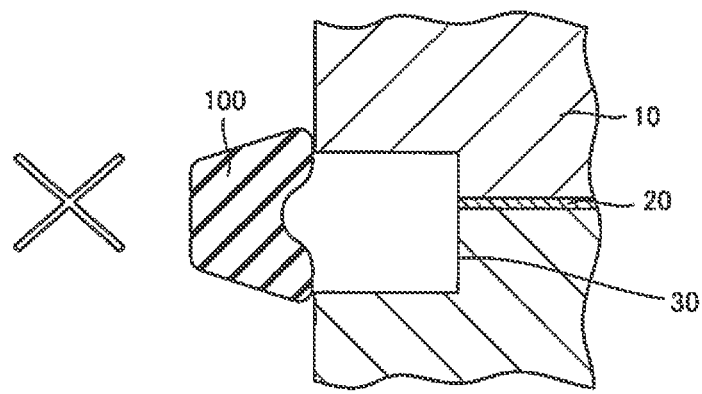
FIG. 7B is a schematic cross sectional view showing an incorrect state of fitting the seal member into the groove.
Figure 7C:
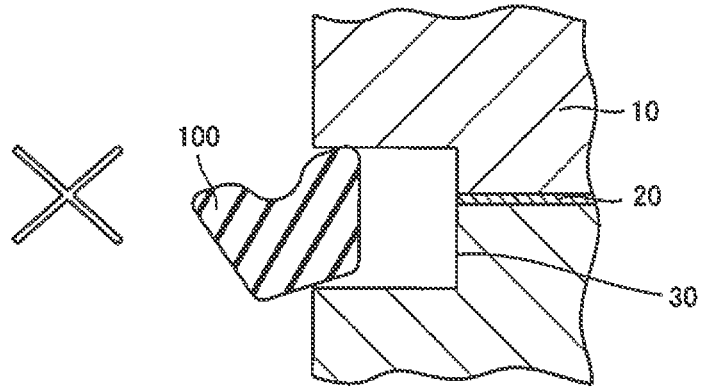
FIG. 7C is a schematic cross sectional view showing an incorrect state of fitting the seal member into the groove.

In seal member 100 in the present embodiment, since first side wall portion 102 and second side wall portion 103 are provided to be outwardly widened from bottom portion 101 toward outer wall portion 104, it is easy to recognize the form as an external appearance, as shown in FIGS. 7A, 7B, and 7C. Accordingly, even when seal member 100 is twisted, such a state can be easily confirmed, and thus occurrence of incorrect fitting into groove 30 can be avoided.

(Analysis Results)

Figure 8:
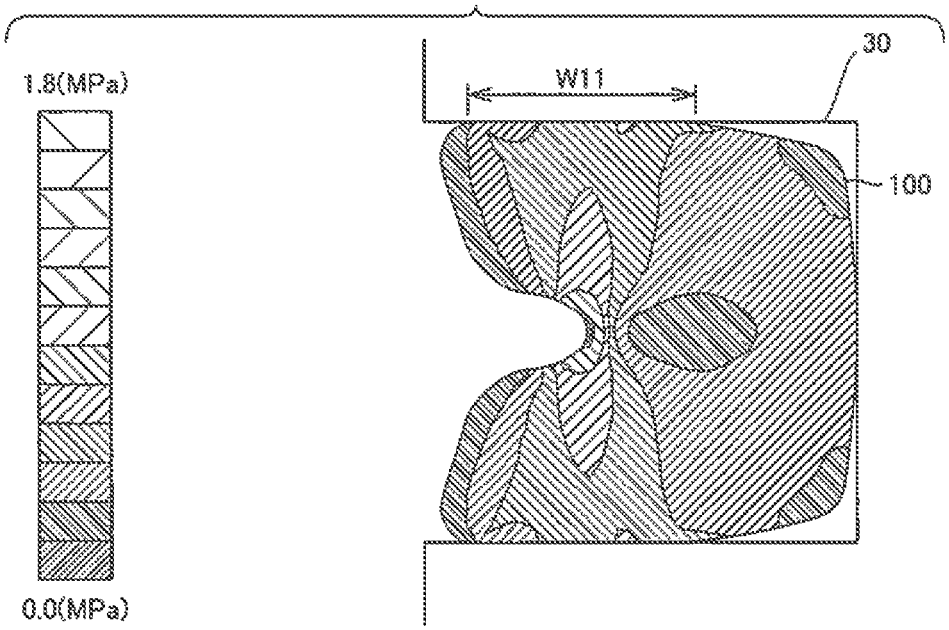
FIG. 8 is a first view showing an analysis result of the seal member in the first embodiment.
Figure 9:
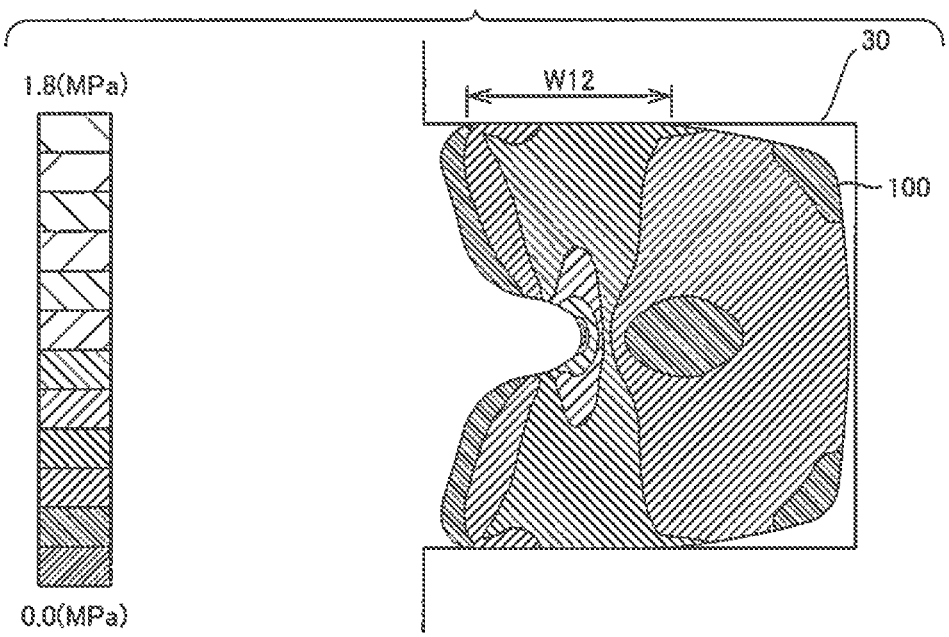
FIG. 9 is a second view showing an analysis result of the seal member in the first embodiment.
Figure 10:
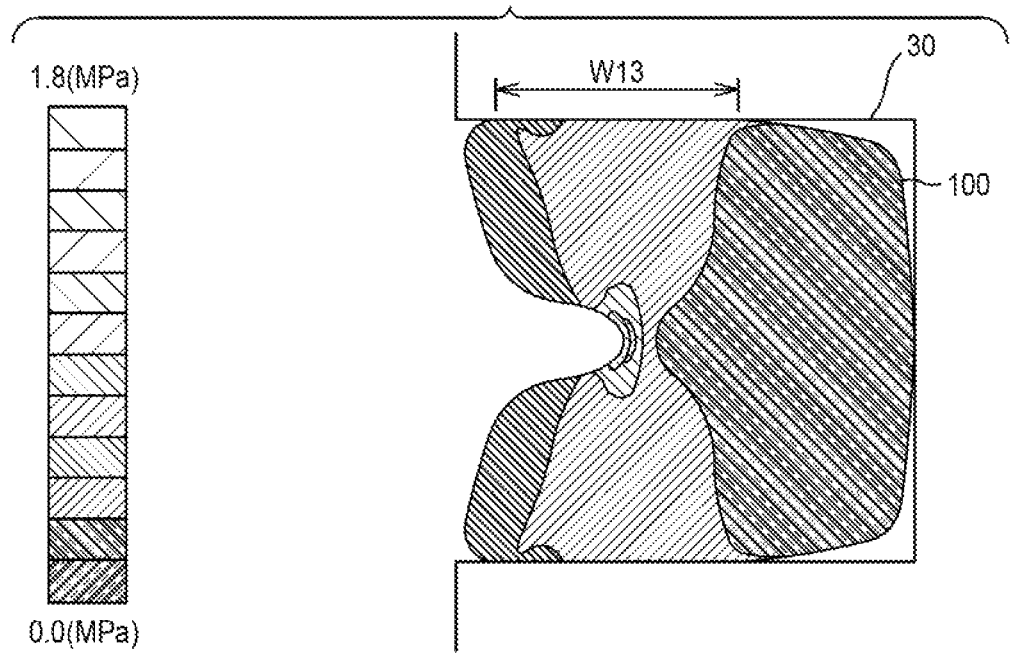
FIG. 10 is a third view showing an analysis result of the seal member in the first embodiment.
Figure 11:
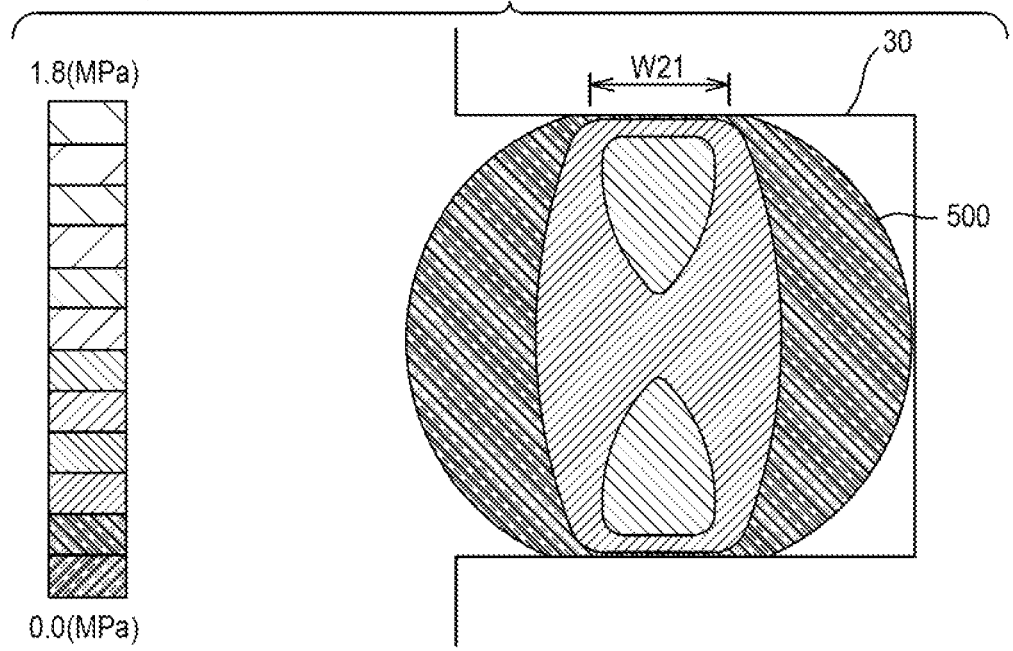
FIG. 11 is a first view showing an analysis result of a conventional O ring.
Figure 12:
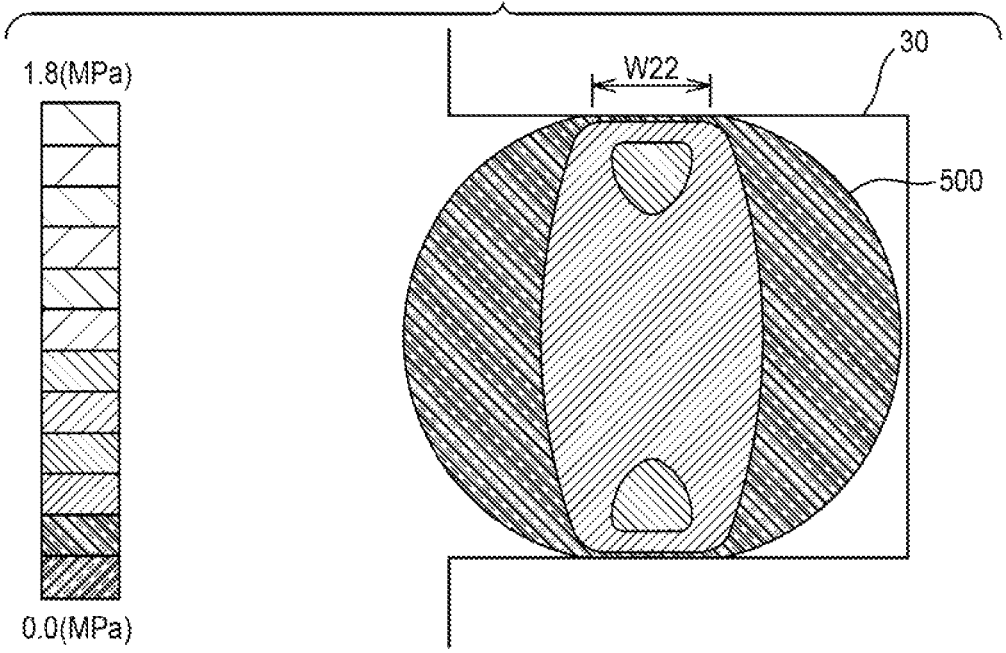
FIG. 12 is a second view showing an analysis result of the conventional O ring.
Figure 13:
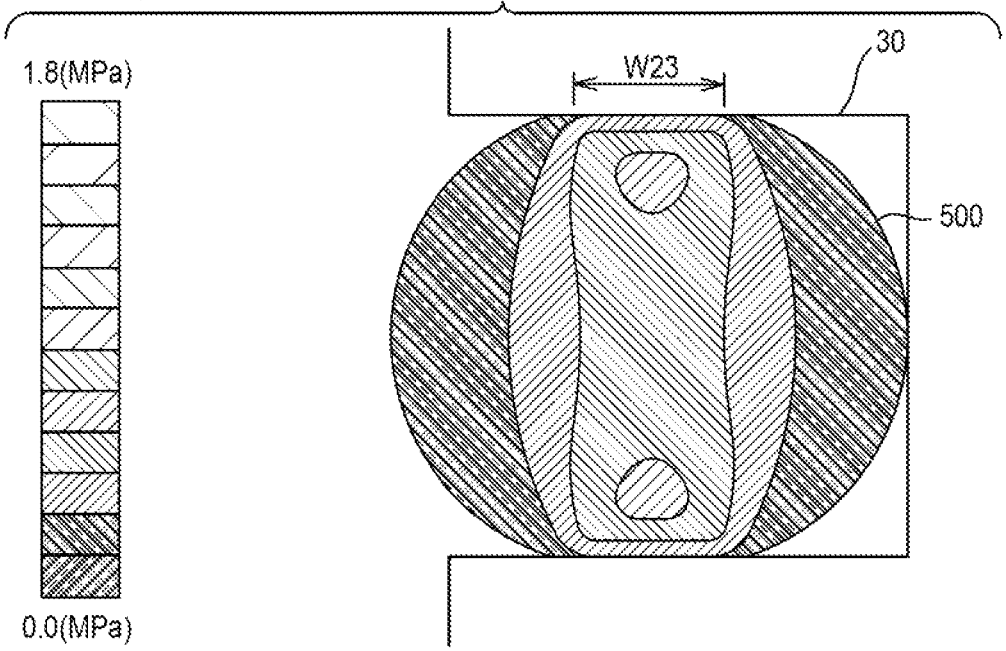
FIG. 13 is a third view showing an analysis result of the conventional O ring.
Figure 14:
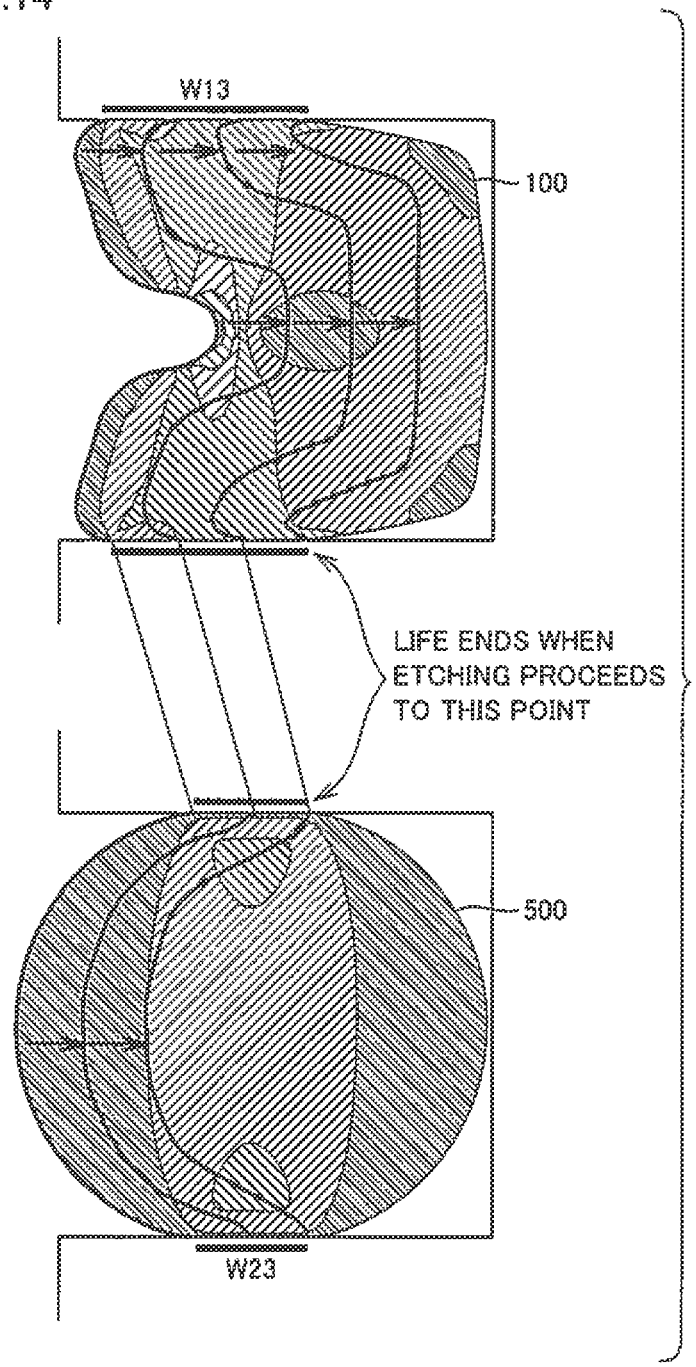
FIG. 14 is a view for comparison between the analysis results of the seal member in the first embodiment and the conventional O ring.

Next, comparison will be made between analysis results of seal member 100 in the present embodiment and a seal member having a circular cross sectional shape (simply referred to as a conventional O ring 500), with reference to FIGS. 8 to 14. FIGS. 8 to 10 are views each showing an analysis result of seal member 100 in the present embodiment, and FIGS. 11 to 13 are views each showing an analysis result of conventional O ring 500. FIGS. 8 and 11 each show the analysis result in a fitted state at ordinary temperature, FIGS. 9 and 12 each show the analysis result in a fitted state at 0° C., and FIGS. 10 and 13 each show the analysis result in a fitted state at 50° C.

The external dimensions of and the material for seal member 100 were as described above. Conventional O ring 500 had dimensions of about 350 mm in inner diameter, and about 2.0 mm in width and height. As conventional O ring 500, FLUORITZ (registered trademark) series manufactured by NIPPON VALQUA, LTD. was used. The fitting load in an ordinary temperature state was about 0.7 N/mm in the case of seal member 100, and was about 1.1 N/mm in the case of conventional O ring 500.

In the case of using seal member 100 in the present embodiment, the contact width with groove 30 was about 0.62 mm at ordinary temperature in FIG. 8 (W11) and at 0° C. (W12), and was about 0.85 mm at 50° C. (13). In the case of using conventional O ring 500, the contact width with groove 30 was about 0.49 mm at ordinary temperature in FIG. 11 (W21) and at 0° C. (W22), and was about 0.59 mm at 50° C. (W23).

(Function and Effect)

As described above, in the case of using seal member 100 in the present embodiment, a large contact width with groove 30 is successfully obtained, although the fitting load is lower than that for conventional O ring 500. As a result, as shown in the comparison view of FIG. 14, even when the seal member is exposed to an external environment and corrosion of the seal member proceeds inward due to etching gas, for example, seal member 100 in the present embodiment can maintain a longer product life, because it has a longer contact width than that of conventional O ring 500.

Second Embodiment: Seal Member 100A

A seal member 100A in a second embodiment will be described with reference to FIG. 15. FIG. 15 is a cross sectional view of seal member 100A. In seal member 100 in the first embodiment, both first side wall portion 102 and second side wall portion 103 are provided to be outwardly widened from bottom portion 101 toward outer wall portion 104. In contrast, in seal member 100A in the present embodiment, only one of them, that is, only first side wall portion 102, is provided to be outwardly widened toward outer wall portion 104, and the other of them, that is, second side wall portion 103, is provided to extend in a direction substantially perpendicular to bottom portion 101.

Also with this configuration, the same function as that in the first embodiment can be obtained in first lip region R1. As a result, substantially the same function and effect as those of seal member 100 in the first embodiment can be obtained.

Third Embodiment: Seal Member 100B

A seal member 100B in a third embodiment will be described with reference to FIG. 16. FIG. 16 is a cross sectional view of seal member 100B. In seal member 100 in the first embodiment, both first side wall portion 102 and second side wall portion 103 are provided to be outwardly widened linearly from bottom portion 101 toward outer wall portion 104. In contrast, in seal member 100B in the present embodiment, first side wall portion 102 and second side wall portion 103 have an arc-shaped form swelling outward.

With this configuration, in a state where first side wall portion 102 and second side wall portion 103 are in pressure contact with first side wall 30b and second side wall 30c of groove 30, first lip region R1 and second lip region R2 can have a longer contact length, when compared with the case where first side wall portion 102 and second side wall portion 103 have a linear-shaped form. As a result, the same function as that in the first embodiment can be obtained, and a longer product life can be expected.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

10: cylindrical member; 10A: first member; 10B: second member, 20: adhesive; 30: groove; 30a: bottom wall; 30b: first side wall; 30c: second side wall; 100, 100A, 100B: seal member; 101: bottom portion; 102: first side wall portion; 103: second side wall portion; 104: outer wall portion; 105: recessed portion; 500: ring; R1: first lip region; R2: second lip region.

The invention claimed is:

1. An annular seal comprising:
a closed annular seal member having a center axis, the annular seal member being a monolithic element fabricated of a single plasma resistant elastic material, the closed annular seal member comprising:
a bottom portion having a substantially flat surface;
a first sidewall portion comprising a first lip region, the first sidewall portion adjoining the bottom portion at a first rounded corner;
an outer wall portion, the outer wall portion comprising a recessed portion extending towards the bottom portion by less than half of a distance from the outer wall portion to the bottom, the recessed portion being recessed towards the bottom portion, the outer wall portion positioned opposite the bottom portion and adjoining the first lip region at a second rounded corner;
a second sidewall portion comprising a second lip region, the second sidewall portion adjoining the outer wall portion at a third rounded corner, and adjoining the bottom portion at a fourth rounded corner, the annular seal member being symmetric about a centerline passing through a center of the recessed portion and a center of the bottom portion, and perpendicular to the center axis; and wherein the first sidewall portion and second sidewall portion are outwardly widened from the bottom portion toward the outer wall portion, and each comprise a surface inclined relative to the centerline that is substantially flat in cross section.

2. The annular seal of claim 1, wherein the single plasma resistant elastic material comprises one of fluorine rubber perfluoroelastomer or unfilled perfluoroelastomer.

3. The annular seal of claim 1, wherein the first sidewall portion and second sidewall portion each forms an angle from 5 to 45 degrees with the centerline.

4. The annular seal of claim 1, wherein the recessed portion is disposed between the first sidewall portion and second sidewall portion.

5. The annular seal of claim 1, wherein an intersection angle between the first sidewall portion and the centerline is from about 5° to 45°.

6. The annular seal of claim 5, wherein an intersection angle between the second sidewall portion and the centerline is from about 5° to 45°.

7. The annular seal of claim 1, wherein the first sidewall portion and second sidewall portion are widened linearly from the bottom portion toward the outer wall portion.

8. The annular seal of claim 1, wherein a portion of the outer wall portion is parallel to the bottom portion.

9. An annular seal member positioned in a groove, comprising:
a cylindrical member comprising:
a first cylindrical member;
a second cylindrical member joined to the first cylindrical member at by an adhesive;
a recessed annular groove defined between the first cylindrical member and the second cylindrical member, the adhesive exposed between the first cylindrical member and the second cylindrical member to the annular groove; and
a closed annular seal member having a center axis, the closed annular seal member being a monolithic element fabricated of a single plasma resistant elastic material, the closed annular seal member disposed in the recessed annular groove, the closed annular seal member comprising:
a bottom portion having a substantially flat surface exposed to the adhesive;
a first sidewall portion in sealing contact with the first cylindrical member, and comprising a first lip region, the first sidewall portion adjoining the bottom portion at a first rounded corner;
an outer wall portion, the outer wall portion comprising a recessed portion extending towards the bottom portion by less than half of a distance from the outer wall portion to the bottom, the recessed portion being recessed towards the bottom portion, the outer wall portion opposite the bottom portion, and adjoining the first lip region at a second rounded corner;
a second sidewall portion in sealing contact with the second cylindrical member, the second sidewall portion adjoining the outer wall portion at a third rounded corner, and adjoining the bottom portion at a fourth rounded corner, the closed annular seal member being symmetric about a centerline passing through a center of the recessed portion and a center of the bottom portion, and perpendicular to the center axis; and wherein the first sidewall portion and second sidewall portion are widened linearly from the bottom portion toward the outer wall portion, and each comprise a surface inclined relative to the centerline that is substantially flat in cross section.

10. The annular seal member of claim 9, wherein the first sidewall portion has a contact surface with the first cylindrical member of between about 0.62 mm and 0.85 mm when the closed annular seal is positioned within the groove.

11. The annular seal member of claim 9, wherein the single plasma resistant material comprises one of fluorine rubber, perfluoroelastomer, or unfilled perfluoroelastomer.

12. An annular seal comprising:
a closed annular seal member having a center axis, the annular seal member being a monolithic element fabricated of a single plasma resistant elastic material, the closed annular seal member comprising:
a bottom portion having a substantially flat surface;
a first sidewall portion comprising a first lip region, the first sidewall portion adjoining the bottom portion at a first rounded corner;
an outer wall portion, the outer wall portion comprising a recessed portion, the recessed portion being recessed towards the bottom portion, the outer wall portion positioned opposite the bottom portion and adjoining the first lip region at a second rounded corner;
a second sidewall portion comprising a second lip region, the second sidewall portion adjoining the outer wall portion at a third rounded corner, and adjoining the bottom portion at a fourth rounded corner, the annular seal member being symmetric about a centerline passing through a center of the recessed portion and a center of the bottom portion, and perpendicular to the center axis; and
wherein the first sidewall portion and second sidewall portion each comprise a surface inclined relative to the centerline, and wherein the first sidewall portion forms a first arc in cross section from the first lip region to the first rounded corner, and second sidewall portion forms a second arc in cross section from the second lip region to the second rounded corner.

13. The annular seal of claim 12, wherein the single plasma resistant elastic material comprises one of fluorine rubber perfluoroelastomer or unfilled perfluoroelastomer.

14. The annular seal of claim 12, wherein the first sidewall portion and second sidewall portion are widened from the bottom portion toward the outer wall portion.

15. The annular seal of claim 12, wherein the first arc and second arc are bowed in a direction away from the centerline.

16. The annular seal of claim 12, wherein a portion of the outer wall portion is parallel to the bottom portion.

17. The annular seal of claim 12, wherein the recessed portion is coupled to the outer wall portion at a fifth rounded corner and a sixth rounded corner.

18. An annular seal comprising:
a closed annular seal member having a center axis, the annular seal member being a monolithic element fabricated of a single plasma resistant elastic material, the closed annular seal member comprising:
a bottom portion having a substantially flat surface;

a first sidewall portion comprising a first lip region, the first sidewall portion adjoining the bottom portion at a first rounded corner;

an outer wall portion, the outer wall portion comprising a recessed portion, the recessed portion being recessed towards the bottom portion, the outer wall portion positioned opposite the bottom portion and adjoining the first lip region at a second rounded corner;

a second sidewall portion comprising a second lip region, the second sidewall portion adjoining the outer wall portion at a third rounded corner, and adjoining the bottom portion at a fourth rounded corner, the annular seal member being symmetric about a centerline passing through a center of the recessed portion and a center of the bottom portion, and perpendicular to the center axis;

wherein the first sidewall portion and second sidewall portion each comprise a surface inclined relative to the centerline that is substantially flat in cross section; and wherein the first sidewall portion forms an angle from 5 to 45 degrees with the centerline and second sidewall portion is parallel to the centerline.

19. An annular seal comprising:

a closed annular seal member having a center axis, the annular seal member being a monolithic element fabricated of a single plasma resistant elastic material, the closed annular seal member comprising:

a bottom portion having a substantially flat surface;

a first sidewall portion comprising a first lip region, the first sidewall portion adjoining the bottom portion at a first rounded corner;

an outer wall portion, the outer wall portion comprising a recessed portion extending towards the bottom portion by less than half of a distance from the outer wall portion to the bottom, the recessed portion being recessed towards the bottom portion, the outer wall portion positioned opposite the bottom portion and adjoining the first lip region at a second rounded corner;

a second sidewall portion comprising a second lip region, the second sidewall portion adjoining the outer wall portion at a third rounded corner, and adjoining the bottom portion at a fourth rounded corner, the annular seal member being symmetric about a centerline passing through a center of the recessed portion and a center of the bottom portion, and perpendicular to the center axis; and wherein the first sidewall portion and second sidewall portion are widened linearly from the bottom portion toward the outer wall portion, and each comprise a surface inclined relative to the centerline that is substantially flat in cross section.

\* \* \* \* \*